UNITED STATES PATENT OFFICE.

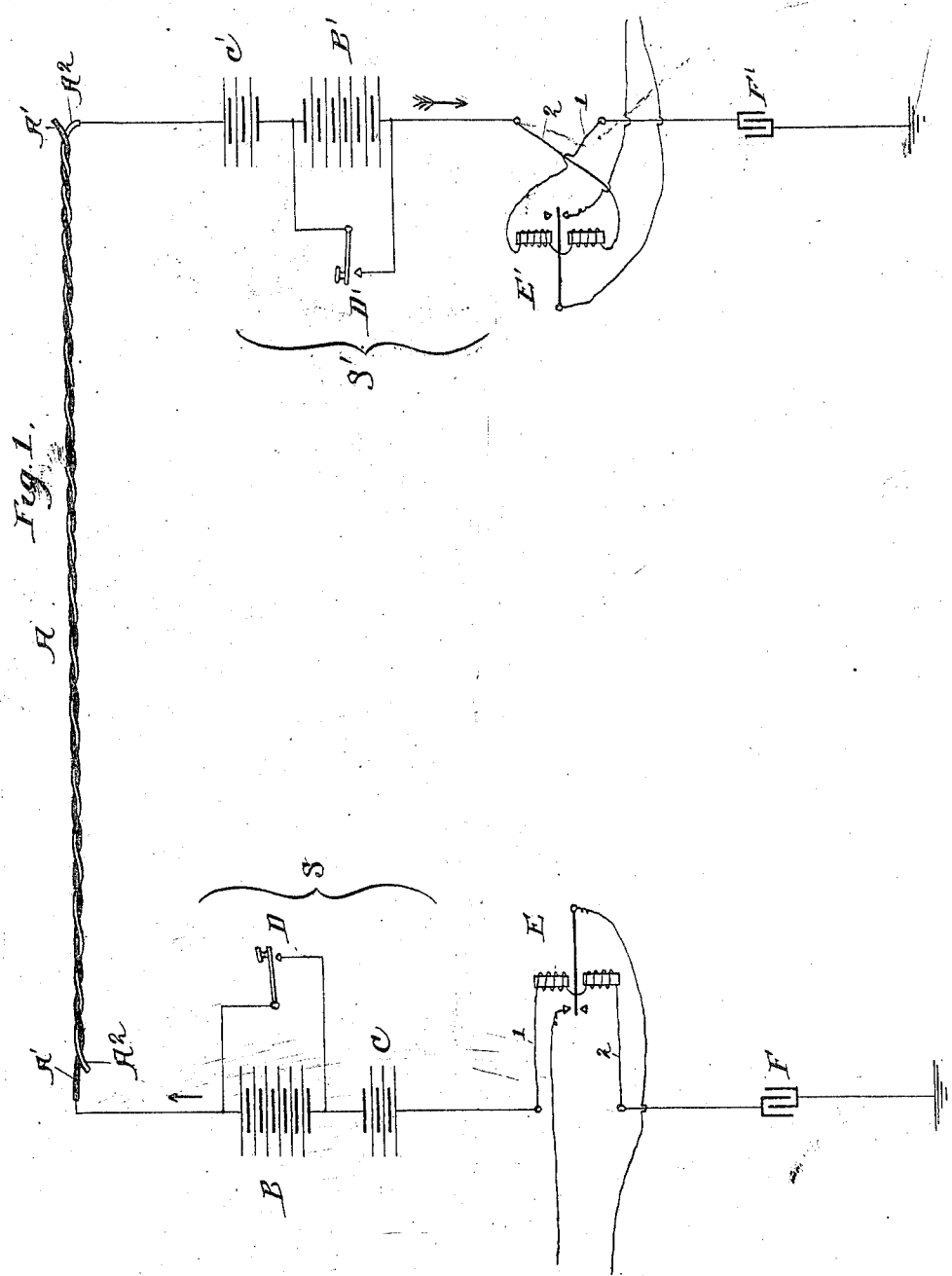

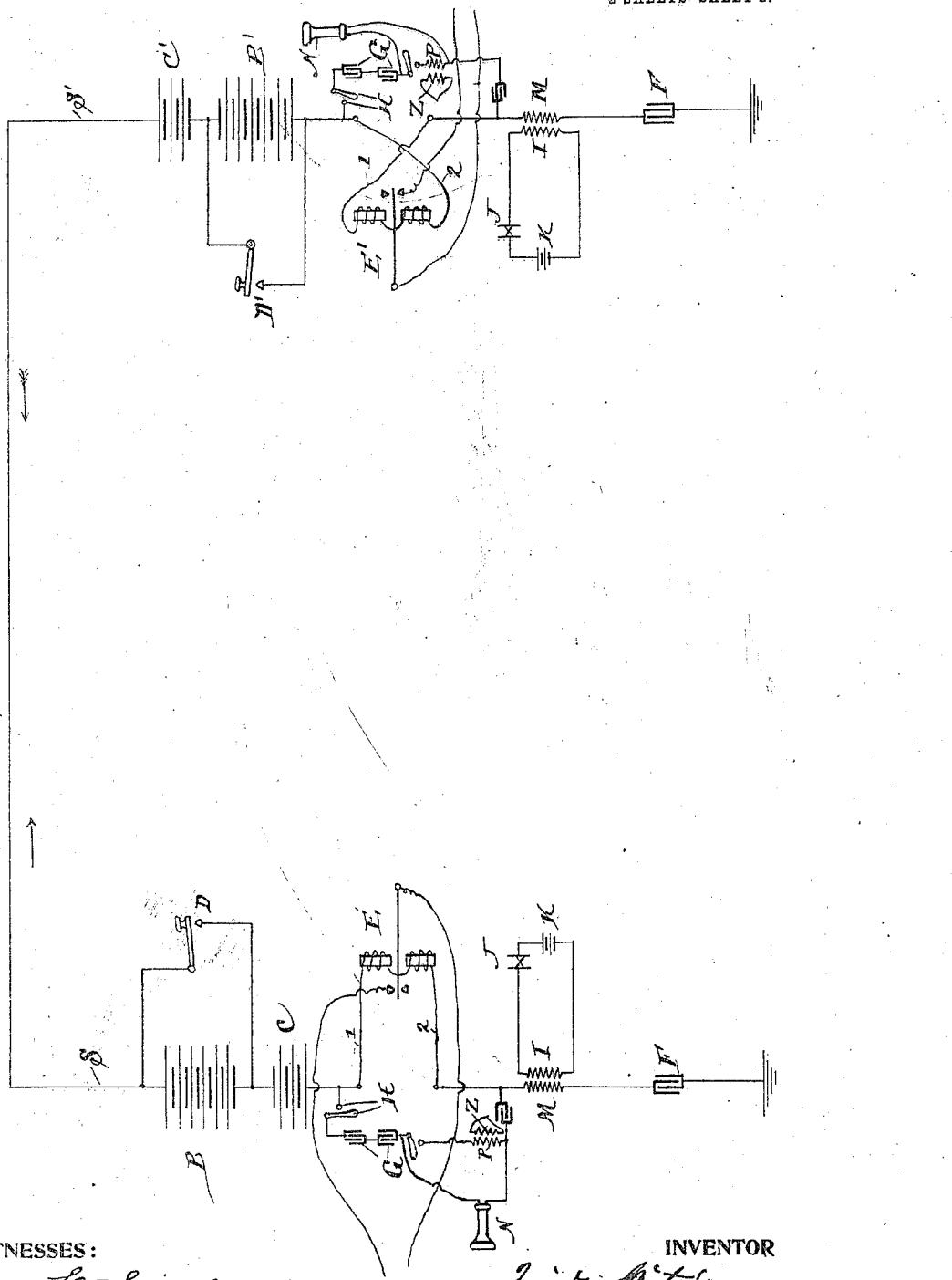

ISIDOR KITSEE, OF PHILADELPHIA, PENNSYLVANIA, ASSIGNOR, BY DIRECT AND MESNE ASSIGNMENTS, TO AMERICAN TELEPHONE AND TELEGRAPH COMPANY, OF NEW YORK, N. Y., A CORPORATION OF NEW YORK.

ELECTRIC TRANSMISSION OF ENERGY.

1,090,990. Specification of Letters Patent. Patented Mar. 24, 1914.

Application filed February 20, 1906, Serial No. 302,037. Renewed January 13, 1914. Serial No. 811,900.

*To all whom it may concern:*

Be it known that I, ISIDOR KITSEE, citizen of the United States, residing at Philadelphia, in the county of Philadelphia and State of Pennsylvania, have invented certain new and useful Improvements in Electric Transmission of Energy, of which the following is a specification.

My invention relates to an improvement in electric transmission of energy. Its object is, to produce an arrangement for transmitting lines whereby true reversals may be transmitted from one terminal station to the other terminal station, without necessitating the changing of the devices placed at the station.

It is also my object to simultaneously telegraph and telephone over the same line.

In the drawings, I have illustrated in Figure 1 my arrangement as applied to a composite line, that is, a line inductively connecting two stations with each other, the two wires of the line being twisted around each other, so as to produce a greater inductive effect. In Fig. 2, I have illustrated my invention as being applied to a metallic line grounded at each terminal station; but it is obvious that instead of a ground a return wire may be employed, without departing from the scope of my invention.

In the drawings, Figs. 1 and 2 are diagrammatic views of a transmitting line provided each with two terminal stations embodying my invention. In Fig. 1, A is the composite line comprising the conductors A' and A². The conductor A' is connected at the terminal S with a source of current B, a source of current C, the polarized relay E, the condenser F and is then grounded. At the station S', the end of this conductor is left free and the conductor A² is connected at the station S' with the source of current C', the source of current B', the polarized relay E', the condenser F' and is then grounded. At both stations are two sources of current in opposition to each other; the sources B and B' consisting, as is illustrated, each of six cells and the sources C and C' consisting, as is illustrated, each of three cells. The batteries of the larger number of cells oppose the batteries of the smaller number. So far the arrangement of both stations is alike, but whereas in station S the battery B connects with the positive pole as to the line and the battery C connects with the positive pole as to the ground, the order at station S' is reversed; the battery C' connects with the positive pole as to the line and the battery B' with the positive pole as to the ground. Whereas, therefore, the current from the source of greater electro-motive force will flow at the station S in the direction of the unfeathered arrow, the current of the source of greater electromotive force will flow at the station S' in the direction of the feathered arrow. At each station the source of greater electromotive force is provided with a shunt and a transmitting key D adapted to open and close said shunt. The polarized relay E is connected in series as to the line and ground at both stations and I have designated the two terminals of said relay by the two numerals 1 and 2, so as to clearly define the connection of said relay as to the line and ground and it will be seen from these drawings that whereas at station S the terminal 1 of the relay E is connected to the line and the terminal 2 to the ground, the connection of the relay E' at the station S' is opposite from that of the first named relay, for at this station the terminal of the relay 2 is connected to the line and the terminal of the relay 1 is connected to the ground. In Fig. 2, similar letters designate similar parts, but the line consisting of only one conductor is designated as A. In this line are also inserted, at each station, telephonic transmitting and receiving devices; the transmitting device embracing the battery K, the microphonic transmitter J, the primary of the inductorium I, the secondary M of which is connected in the line. In the line is also connected at each station the telephonic receiver N. In this figure, the relays E and E' are also provided with a shunt consisting of the condensers G of comparative small capacity and the primary P of an inductorium, the secondary Z of which is closed around itself. The shunt can be closed through the switch H. The receiver N is in shunt with the primary P and this shunt can be opened and closed through a switch, as desired.

I will describe the operation of the arrangement as illustrated in Fig. 2; the arrangement as illustrated in Fig. 1 being operated in a similar way.

Normally, that is, when the line is idle, one impulse will flow over said line at the beginning in the direction of the unfeathered arrow. When the operator at station S desires to transmit telegraphic messages, he closes his key is accordance with the characters to be transmitted. As soon as his key is closed, the source B is shunted and through this shunting an impulse will flow over the line in the direction of the feathered arrow. This impulse is due to the discharging of the condensers F, for the reason that the potentials of the sources of current in the line being zero, the potentials of the condensers will also fall to zero, but as soon as the key is open, the potential of the batteries will be plus 6 and, therefore, an impulse will flow in the same direction charging the condensers. Should the operator at station S' depress his key, then an impulse will flow over the line similar to the impulse when the operator at station S depressed his key, that is, in the direction of the feathered arrow, but as soon as the operator releases his key, an impulse will flow in the direction of the unfeathered arrow. Through the insertion of the condensers all impulses will be limited to a like duration. Through this reversed flow of impulses, the tongue of the relays E and E' will be operated on and through this operation a local circuit will be made or broken. I have found that over such lines telephonic impulses can be transmitted simultaneously with the transmitting of telegraphic impulses, provided that the telegraphic relays are built in a manner, so that impulses traveling through a condenser could affect them in the same manner as the usual polarized relays are affected by the flow of a voltaic current. Such relays require for their electromagnets a large amount of ampere turns and these electromagnets, therefore, offer to the telephonic impulses a great resistance and impedance.

After careful experiment with resistance, coils and condensers, I have found that if condensers of very small capacity are connected in shunt as to the coils of the relay, the telephonic impulses will travel through these condensers, but the telephonic impulses will flow in the greater part through the coils of the relay. At the first glance, it would seem that both the telephonic and telegraphic impulses would travel through the condensers rather than through the coils of the relay, for the reason that both of these impulses are due to the charging and discharging of the condensers F and in reality these impulses would seek the condensing shunt in their entirety, were it not for the reason that the condensing shunt is of such small capacity, that only a very small part of the charge of the large condensers can pass through the same, and the larger part has, therefore, to go through the coils. Again, the telephonic impulses are so feeble, that they can, in their entirety, pass through condensers even of such small capacity as is employed in the shunt. In the drawing, I have illustrated this shunt as to consist of three condensers in series, each condenser having a capacity of one-fourth of a M. F. The whole shunt, therefore, has a capacity of one fourth divided by three which equals one-twelfth of a M. F. Practice has shown that with the intervention of the inductorium P, the received sounds are more distinct that if such inductorium would not be present. It seems that the impulses reacting from the primary on the secondary give more satisfaction than when a simple non-inductive resistance is employed for this inductorium.

Having now described my invention, what I claim as new and desire to secure by Letters Patent is:

1. A line of transmission provided with telephonic and telegraphic transmitting and receiving devices, the telegraphic transmitting device comprising two sources of current in opposition as to each other and normally in the line, a shunt around one of said sources and a transmitting key adapted to open and close said shunt; the telegraphic receiving device comprising a polarized relay inserted in said line; the telephonic transmitting device comprising a microphonic transmitter, a source of current and an inductorium, the secondary of said inductorium connected in the line, the telephonic receiving device comprising a telephonic receiver connected in shunt as to the polarized relay.

2. Means to simultaneously transmit telegraphic and telephonic impulses over a line, said means comprising a line of transmission and comprising for the telegraphic communication a telegraphic transmitting device and a polarized relay inserted in the line in series, and comprising for the telephonic communication a telephonic transmitting device and an inductorium as sender and a telephonic receiver, said receiver connected, with the interposition of a condenser, to both terminals of the telegraphic receiving relay directly.

3. In combination, a line of transmission, a station for each terminal of said line and means for each of said stations to transmit and receive simultaneously telegraphic and telephonic messages, the means to transmit telegraphic messages comprising means to transmit an impulse of one polarity as the beginning and an impulse of opposite polarity as the ending of one telegraphic character and the means to receive telegraphic messages comprising a polarized relay; the means to transmit telephonic messages comprising a microphonic transmitter, a source of current, an inductorium, the secondary thereof connected in the line of transmission and the means to receive telephonic messages comprising a telephonic receiver connected in shunt as to the polarized relay.

In testimony whereof I affix my signature in presence of two witnesses.

ISIDOR KITSEE.

Witnesses:
　MARY C. SMITH,
　ALVAH RITTENHOUSE.